Figure 1:
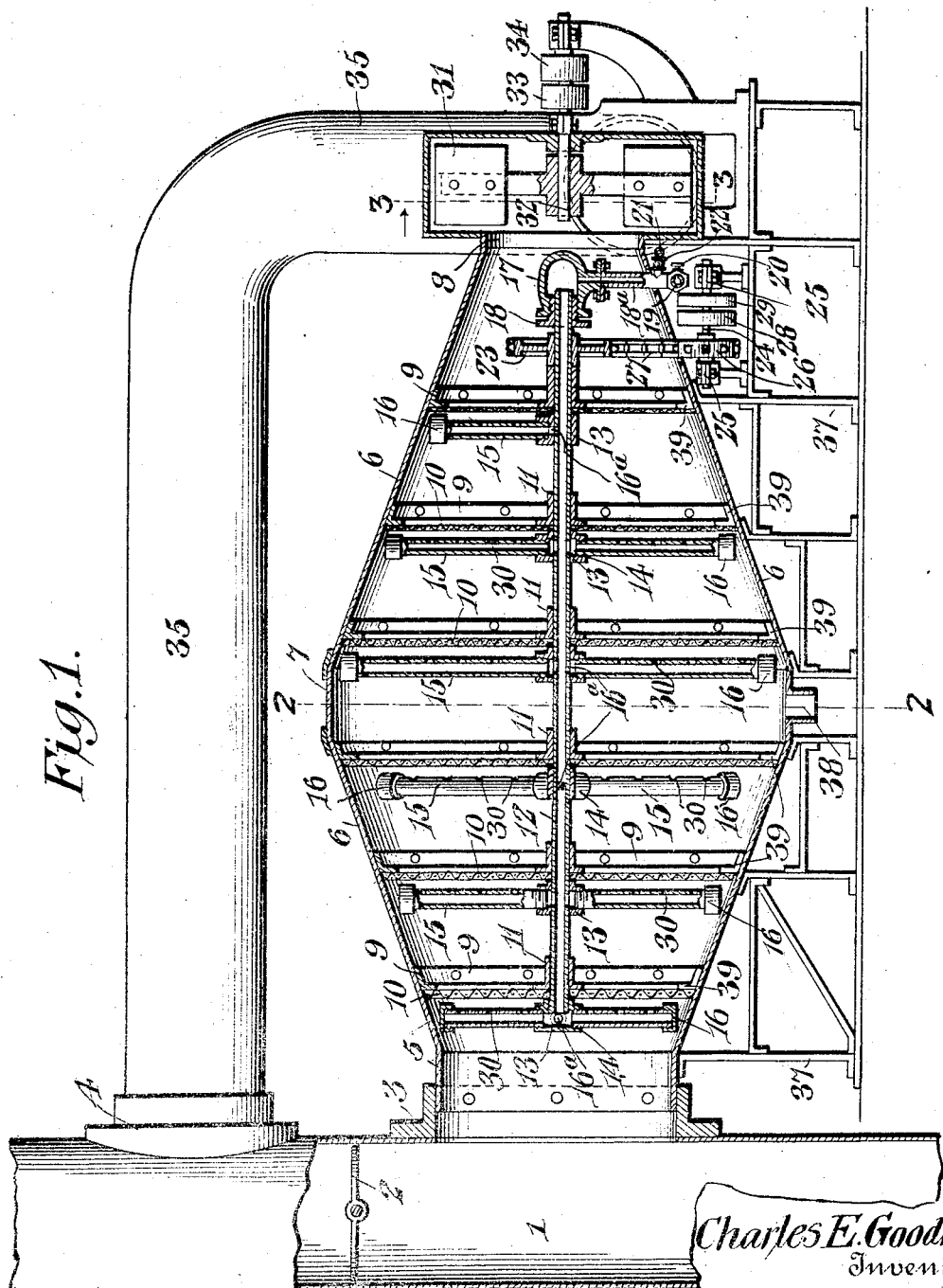

C. E. GOODRICH.
MEANS FOR RECOVERING DUST AND OTHER MATERIALS.
APPLICATION FILED JULY 17, 1911.

1,041,617.

Patented Oct. 15, 1912.

2 SHEETS—SHEET 1.

Charles E. Goodrich
Inventor

Witnesses

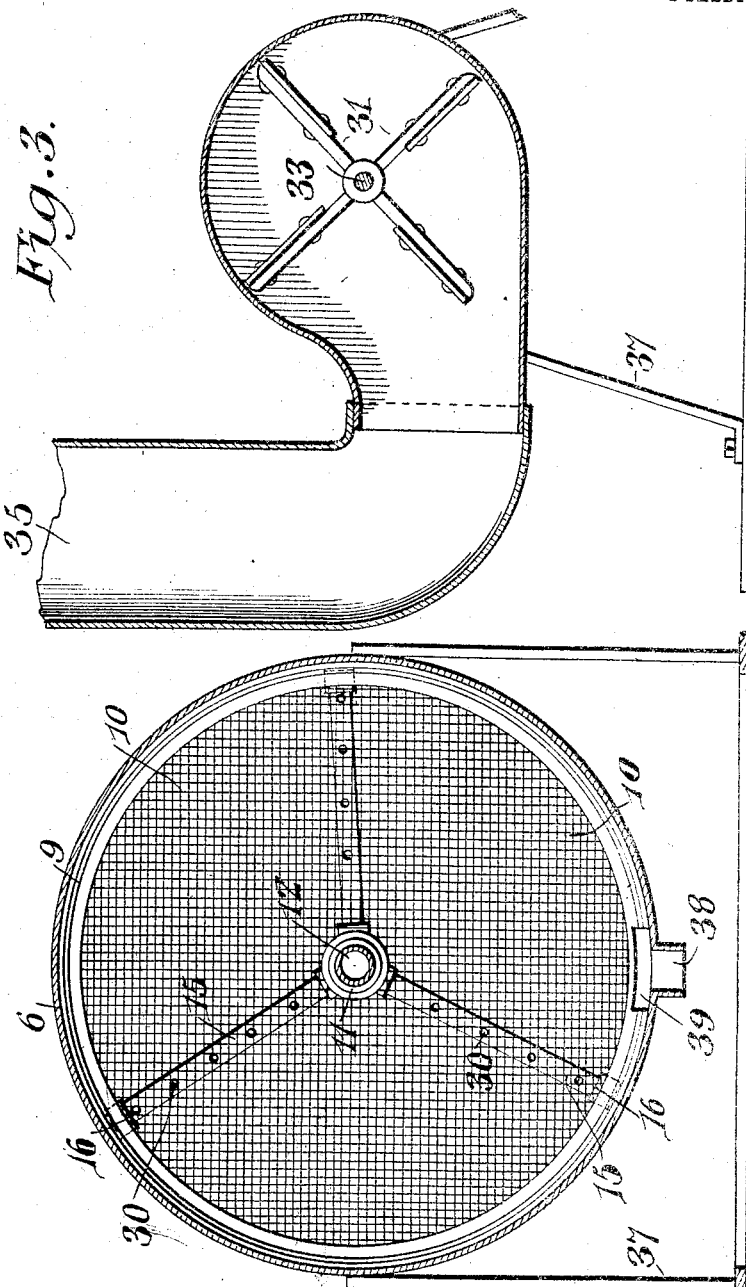

UNITED STATES PATENT OFFICE.

CHARLES EBENEZER GOODRICH, OF DAGGETT, CALIFORNIA.

MEANS FOR RECOVERING DUST AND OTHER MATERIALS.

1,041,617.

Specification of Letters Patent.  Patented Oct. 15, 1912.

Application filed July 17, 1911. Serial No. 639,047.

*To all whom it may concern:*

Be it known that I, CHARLES E. GOODRICH, a citizen of the United States, residing at Daggett, in the county of San Bernardino and State of California, have invented a new and useful Means for Recovering Dust and other Materials, of which the following is a specification.

This invention has reference to improvements in means for recovering dust and other materials usually carried off in the stack of roasting or calcining furnaces or kilns, or the like, and its object is to provide for the recovery of materials in dust-like form, or in the volatilized state which in the roasting of ores or other materials have heretofore passed out through the stack with the products of combustion and have represented a total loss, which in the case of some substances represents a very material loss.

In the treatment of certain refractory ores, preliminary roasting constitutes a necessary part of the process used for extracting the values of the ores, and this is true also in the treatment of the raw material used in the manufacture of Portland cement and in the treatment of lime and other material, and a considerable portion of the fine pulp is carried off by the hot gases of combustion under the action of the strong draft necessary to properly promote the combustion of the fuel used in the reduction of such substances.

In the smelting of ores not only is there a loss of material by the escape of the fine pulp called flue dust, but many of the valuable metals of the ores are extremely volatile when exposed to high temperatures and such metals so volatilized pass away with the gases of combustion and are lost.

The present invention comprises a by-pass connected to the stack of the furnace in such manner that the gases of combustion may follow the usual course through the stack or be diverted through the by-pass, and in this by-pass there is located a separator provided with a plurality of screens through which the products of combustion with the materials carried thereby, whether in the form of flue dust or in volatilized form, are directed, and water is directed against these screens in such manner that the hot gases of combustion with materials carried thereby are progressively cooled until ultimately the materials are trapped by the water and finally carried to a point of escape to be conducted therefrom to a suitable point of treatment for the recovery of the saved materials from the water.

After passing through the extracting portion of the by-pass, the lean gases of combustion may return to the stack to pass out of the same in the usual manner. In order to promote the draft through the collecting portion of the by-pass, a suitable fan is provided, so that the natural draft of the stack is supplemented by such fan. Of course, instead of returning the cleansed or lean gases to the stack, the gases may be discharged directly into the atmosphere from the fan.

The invention will be best understood from a consideration of the following detailed description, taken in connection with the accompanying drawings forming a part of this specification, with the understanding, however, that the showing of the drawings illustrate but a single embodiment of the invention, which, however, is not the only practical form the invention may assume, for different conditions demand changes and modifications to meet them, while the salient features of the invention are still retained.

In the drawings:—Figure 1 is a longitudinal section in substantially the line of the axis of the separator portion of the structure where the separator is included in a by-pass in a stack. Fig. 2 is a section on the line 2—2 of Fig. 1 with some distant parts omitted. Fig. 3 is a section on the line 3—3 of Fig. 1.

Referring to the drawings, there is shown a stack 1 without any attempt to indicate relative proportions, so that the stack may be taken as simply indicative of any stack for any reducing furnace wherein there is a liability of losses by the escape of flue dust or volatilized values or both through the stack because of the draft or blast. The stack is provided at an appropriate point with a damper 2. On one side of the damper, that is on the side of the damper toward the furnace, the stack is provided with a collar 3, the interior of which communicates with the interior of the stack, and on the other side of the damper there is another collar 4 also communicating with the interior of the stack.

The collar 3 receives a neck 5 on one end of a separator casing 6, the latter in the particular form shown comprising two frusto-conical sections joined at the bases by a comparatively short cylindrical portion 7, and that frusto-conical end of the casing 6 remote from the collar 3 may be somewhat prolonged and provided with a short neck 8 at its smaller end, which neck may be of less diameter than the neck 5 entering the collar 3.

Within the casing 6 in spaced relation one to the other are rings 9 of angle material, and each ring supports a screen 10 of a diameter about equal to the inner diameter of the casing 6 at the respective ring. In the drawings there are shown six screens and six supporting rings, there being three screens on one side of the central portion 7 and three screens on the other side thereof, but the particular number of screens will depend upon the conditions to be met in each particular instance, and no definite instructions can be given for an installation without information as to the conditions present. The showing of the drawings is, therefore, in this respect largely indicative and the particular form and disposition of the casings 6 is also largely indicative.

For a purpose which will presently appear, the mesh of the screens may be progressively finer or smaller from the intake end of the casing 6, which is the end entering the collar 3, to the exit end of the casing, which is the end provided with the neck 8. Each screen, which in the practical form of the invention is a metallic screen, carries at its center a journal 11, the several journals 11 being in axial alinement. These journals 11 are designed to receive a hollow shaft 12 of sufficient length to extend through all the journals, and each shaft adjacent the respective journal carries hubs 13 formed with radial screw sockets 14 in each of which is made fast to one end of a pipe 15 extending radially with reference to the shaft 12 to a point adjacent the corresponding portion of the inner wall of the casing 6. Each pipe 15 at the end remote from the socket 14 is closed by a suitable cap 16. The hollow shaft 12 is provided with an appropriate number of passages 16$^a$ through its walls matching the necks 14 and pipes 15, so that the interior of the shaft is in communication with all the pipes.

That end of the shaft 12 toward the neck 8 enters a hollow bearing 17 through a stuffing box 18, so that the shaft may turn on its longitudinal axis but still leakage be prevented by the stuffing box. The bearing 17 has its interior connected to a pipe 18$^a$, which in turn has another pipe 19 branched off therefrom with an interposed valve 20, and between the pipe 19 and the bearing 17 the pipe 18$^a$ has another pipe 21 branched off therefrom with an interposed valve 22.

The shaft 12 preferably adjacent the bearing 17 carries a sprocket wheel 23 and exterior to the casing is a counter-shaft 24 mounted on bearings 25 and carrying a sprocket wheel 26 exterior to the casing 6 and connected to the sprocket wheel 23 by a sprocket chain 27 entering the casing 6. The counter-shaft 24 is provided with tight and loose pulleys 28, 29, respectively, for the application of power through a belt, but it will be understood that the tight and loose pulleys are simply indicative of any means for imparting rotative movement to the counter-shaft, and where electric current is available an electric motor would constitute such means.

The several pipes 15 are provided with perforations 30 directed toward the screens 10 and by introducing water from a suitable source of supply by way of the pipe 19 into the pipe 18 and through the bearing 17 into the pipe 12 streams of water may be directed against the faces of the screens 10 presented toward the stack and by imparting a rotative movement to the shaft 12, these streams may be caused to sweep over the screens.

The neck 8 is connected to the intake of a fan or blower 31 having a shaft 32 provided with tight and loose pulleys 33, 34, respectively, for the application of power, and which may be taken simply as indicative of any means for rotating the fan, which means where electric current is available would be an electric motor.

The fan 31 may be of any form best adapted for the purpose and no attempt is made to show any particular type of fan, nor is the invention limited in any manner to any particular type of fan. The fan 31 discharges into a flue 35 which is carried to the neck 4 and in turn discharges into the stack 1 above the damper 2.

The casing 6 is supported upon a suitable framework 37 which need not be described in detail, and the connecting section 7 of the casing 6 is formed with an outlet 38 at the bottom portion, so that water will readily gravitate to this point, it being understood that the longitudinal axis of the casing 6 is usually arranged substantially horizontal. Each ring 9 at the point which constitutes the lower portion of the ring is formed with a cut away portion 39, so that water gravitating to the lower portion of the casing may find ready escape through the cut away portion 39 of the ring into the portion of the casing next lower to the ring until ultimately the outlet 38 is reached, which outlet is assumed to be connected to any point of disposal of the water flowing through such outlet.

When the damper 2 is open, then the products of combustion will pass up through the stack in the usual manner. When the roasting furnace or smelter, as the case may be, is in proper working order, the damper 2 is closed, and the exhaust fan and other moving parts of the collector having been previously set in motion, a strong draft is created by the fan, causing the products of combustion and any materials carried thereby to pass through the interior of the casing 6 and ultimately into the flue 35 to be returned to the stack above the damper through the neck 4.
When the parts are set in motion, water is directed into the hollow shaft 12 by way of the pipes 18ᵃ and 19 by opening the valve 20, and the shaft 12 being given a rotative movement by the rotation of the counter-shaft 24 acting through the sprocket wheels 23 and 26 and chain 27 will cause streams of water to flow through the openings or perforations 30 on to the screens, all parts of the screens being reached by the jets of water because of the rotative movement of the shaft 12 and the pipes 15 carried thereby.

Those products of combustion which reach the first screen in order are very hot and the water deposited on this screen from the adjacent pipes 15 is converted into steam, and if the products of combustion be hot enough, into dry steam, but the conversion of the water into steam has caused a cooling and contraction of the hot gases, which on reaching the second screen are further cooled and contracted, and the water on the second screen if the gases be still hot enough is converted into steam, but this steam may be wet steam, so that by the time the third screen is reached, there is more or less condensation of the steam, and before the final screen is reached the steam has all been condensed and any volatile matter initially carried by the hot gases of combustion has likewise been condensed and if soluble has become dissolved in the condensed steam and water thrown on the screens from the pipes 15, while the flue dust carried by the exhaust gases has been caught by the water and the latter with the entrapped dust and entrapped or dissolved matters initially volatilized and directed into the stack gravitate down the inclined bottom of the casing 6 through the passages or cut away portions 39 and finally reach an escape by way of the outlet 38, and the water so escaping with the materials carried thereby may be directed to settling tanks or separating apparatus, whereby the materials carried by the water may be recovered. The comparatively cool and lean gases reaching the fan will be discharged by the latter into the flue 35 and directed into the stack above the damper 2.

If the separator be installed at some distance from the furnace, the gases may have cooled so that no steam will be generated at the first screen or screens, wherefore the water will simply dampen the dust at the entrance of the gases into the casing 6 with the precipitation of the dust upon the screens to be washed therefrom by the water issuing through the perforations or orifices 30.

When the discharge side of the fan is connected by the flue 35 to the stack, the natural draft of the stack will aid the fan in withdrawing the gases from the stack below the damper.

At times the screens become choked in whole or in part with accumulations which are not readily soluble in water and which are not easily washed away from the screens by the water jets ordinarily impinging thereon. Under these circumstances the valve 20 may be closed and the valve 22 opened, the pipe 21 being connected to a source of steam under high pressure and jets of steam may be directed against the screens, thoroughly cleansing or scouring them.

Not only may the screens be of progressively finer mesh from the entrance to the exit ends of the casing 6, but the outlets in the pipes 15 and the number of pipes 15 in relation to the respective screens may vary. As an example, the first hole in a certain branch pipe 15 of any of the series of the pipes may be placed, say, six inches from the center of the stream, the second hole or perforation one foot therefrom, the third perforation eighteen inches, and so on. The second pipe will then have the first hole seven and one-half inches from the center, the second thirteen and one-half inches, the third hole nineteen and one-half inches, and so on. The third pipe will have the first hole nine inches from the center, and the fourth pipe ten and one-half inches center to center, the remaining holes in each pipe being spaced six inches apart. These figures are merely given as examples, and are not at all mandatory and the invention is by no means limited to any exact conformity with these figures.

Since the first screen is subjected to the hottest portion of the gases it may be provided with a greater number of branch or radial pipes 15. The first screen may have four of these branch pipes. Further on toward the discharge end the number of branch pipes may be reduced to three, while the finest screen may have but one branch pipe 15 in operative relation thereto. These particular proportions are not at all mandatory and are given by way of example only, without limitation of the invention to any such arrangement.

It will, of course, be understood that suitable means for access to the interior of the casing are provided but it is deemed unnecessary to show any such means as the usual practice of such cases may be followed.

What is claimed is:—

1. A means for the purpose described comprising an elongated conduit for the passage of products of combustion carrying materials to be extracted therefrom, said conduit having its longitudinal axis substantially horizontal when in use, a plurality of spaced, substantially upright stationary screens in said conduit extending completely across the conduit and in position to be progressively traversed by the products of combustion, and water directing means on the side of each screen toward the on-coming products of combustion and related to said screens to forcibly direct streams of water against and through the screens over substantially their entire areas in substantially the direction of the longitudinal axis of the conduit, said conduit being provided with means for the escape of water to maintain the conduit free from accumulations of water.

2. A means for the purpose described comprising an elongated conduit for the passage of the products of combustion, carrying materials to be extracted therefrom, said conduit having its longitudinal axis substantially horizontal when in use, a plurality of spaced, substantially upright screens in said conduit in transverse relation thereto and in position to be progressively traversed by the products of combustion, and rotative water directing means on the side of each screen toward the oncoming products of combustion, said water directing means being related to the screens to direct streams of water against and through the screens in substantially the direction of the longitudinal axis of the conduit.

3. A means for the purpose described comprising an elongated conduit having its longitudinal axis substantially horizontal when in installed position, a series of spaced and substantially upright screens extending entirely across the conduit and progressively increasing in fineness from the entrance of the conduit toward the exit end thereof, and water directing means adjacent those faces of the screens toward the entrance end of the conduit and positioned to project streams of water against and through the screens in the same direction as the travel of the products of combustion therethrough.

4. A means for the purpose described comprising a conduit for the passage of products of combustion containing materials to be extracted therefrom, a series of spaced screens in the conduit in transverse relation to the length thereof, and means for directing streams of water through the screens in the same direction as the travel of the products of combustion therethrough, the capacity of said last named means to direct water through the screens being greater at those screens adjacent the entrance to the conduit than at those screens adjacent the exit end of the conduit.

5. The combination with a furnace stack, of a substantially horizontally arranged conduit connected at the opposite ends to the stack at spaced points of the latter, said conduit containing a series of substantially upright previous screens spaced apart in the direction of the length of the conduit and each extending wholly across the conduit, and means for forcibly projecting streams of water against each screen over substantially the whole surface of such screen in the direction of movement of the products of combustion through the screen, the conduit having means for the escape of water therefrom at a point below the lowest part of any of the screens.

6. A means for the purpose described comprising a conduit, a series of screens spaced apart in the direction of the length of the conduit with each screen in transverse relation to the conduit, said screens increasing in fineness from the entrance toward the exit end of the conduit, and rotative means for directing streams of fluid against the screens, said rotative means being of a capacity to direct more streams of water against those screens adjacent the entrance of the conduit than against those screens adjacent the exit end of the conduit.

7. A means for the purpose described comprising a casing having walls declining toward an outlet point, screens within the casing in transverse relation to the length of the casing, said screens increasing in fineness from one end of the casing toward the other, a rotatable hollow shaft extending through the screens, and radial hollow arms carried by and communicating with the interior of the shaft adjacent the screens, each arm being provided with perforations or passages directed toward the respective screen, the arms being more numerous adjacent the screens of larger mesh than adjacent the screens of smaller mesh.

8. A means for the purpose described comprising a casing having walls declining toward an outlet point, screens within the casing in transverse relation to the length of the casing, said screens increasing in fineness from one end of the casing toward the other, a rotatable hollow shaft extending through the screens, radial hollow arms carried by and communicating with the interior of the shaft adjacent the screens, each arm being provided with perforations or passages directed toward the respective screen, the arms being more numerous adjacent the screens of larger mesh than adjacent the screens of smaller mesh, means for imparting rotative movement to the shaft, and an exhaust fan communicating with that end of the casing remote from the screens of coarser mesh.

9. The combination with a furnace stack, of a casing connected at one end thereto, said casing increasing in diameter toward the center and then decreasing in diameter toward the other end and provided with an outlet at an intermediate point, a series of screens spaced apart in the direction of the length of the casing and extending transversely of said casing, the screens being of progressively smaller mesh in a direction away from the stack, journal bearings carried by each screen in the longitudinal axis of the casing, a hollow shaft extending through the screens and mounted in the journal bearings, hollow arms or pipes carried by the hollow shaft in radial relation thereto and adjacent the faces of the screens directed toward the stack, each pipe being provided with perforations or passages directed toward the respective screen, means for directing fluid into the hollow shaft, means for rotating the hollow shaft, an exhaust fan communicating with the end of the casing remote from the stack, and a flue connected with the discharge end of the fan and also connected with the stack, said stack being provided with a valve or damper between the point of connection of the casing and the point of connection of the flue from the fan with said stack.

10. The combination with a furnace stack, of a substantially horizontal conduit for gases of combustion communicating at its opposite ends with the stack at spaced points thereof, stationary pervious screens in the conduit extending wholly across the conduit in transverse relation thereto and of a fineness to tend to retain water, means for directing gases of combustion from the stack through the conduit, and means for forcibly directing water against and through those faces of the screens toward the entrance end of the conduit and in the direction of flow of gases through the conduit, said water directing means being active over substantially the entire area of each screen, and the conduit being provided with means for the escape of water therefrom at a point below the lowest part of the screens.

11. The combination with a furnace stack, of a substantially horizontal conduit for gases of combustion communicating with the stack at spaced points thereof, pervious screens in the conduit in transverse relation thereto and of a fineness to tend to retain water, means for directing gases of combustion through the conduit from the stack, and means for directing water against and through those faces of the screens toward the entrance end of the conduit and in the direction of flow of gases through the conduit, the water directing means being mounted for rotation about an axis coincident with the longitudinal axis of the conduit.

In testimony that I claim the foregoing as my own, I have hereto affixed my signature in the presence of two witnesses.

CHARLES EBENEZER GOODRICH.

Witnesses:
Geo. B. Hart,
J. H. Flint.